(12) United States Patent
Kanai

(10) Patent No.: US 8,282,286 B2
(45) Date of Patent: Oct. 9, 2012

(54) CROSSED ROLLER BEARING RETAINER AND CROSSED ROLLER BEARING

(75) Inventor: Satoru Kanai, Nagano-ken (JP)

(73) Assignee: Harmonic Drive Systems Inc., Tokyo (JP)

( * ) Notice: Subject to any disclaimer, the term of this patent is extended or adjusted under 35 U.S.C. 154(b) by 110 days.

(21) Appl. No.: 12/930,558

(22) Filed: Jan. 11, 2011

(65) Prior Publication Data

US 2011/0194798 A1 Aug. 11, 2011

(30) Foreign Application Priority Data

Feb. 10, 2010 (JP) ................................. 2010-027616

(51) Int. Cl.
*F16C 19/40* (2006.01)
(52) U.S. Cl. .......................... 384/447; 384/551
(58) Field of Classification Search ............... 384/47, 384/551, 447
See application file for complete search history.

(56) References Cited

U.S. PATENT DOCUMENTS

| | | | | |
|---|---|---|---|---|
| 4,479,683 A | * | 10/1984 | Kanamaru | 384/621 |
| 4,687,345 A | * | 8/1987 | Geka | 384/47 |
| 4,896,974 A | * | 1/1990 | Shimizu | 384/551 |
| 4,915,513 A | * | 4/1990 | Orain | 384/447 |
| 7,073,948 B2 | * | 7/2006 | Neder et al. | 384/447 |

FOREIGN PATENT DOCUMENTS

| | | |
|---|---|---|
| JP | 05-276768 | 10/1993 |
| JP | 10-141363 | 5/1998 |
| JP | 3424875 | 5/2003 |

* cited by examiner

*Primary Examiner* — Thomas R Hannon
(74) *Attorney, Agent, or Firm* — Flynn, Thiel, Boutell & Tanis, P.C.

(57) ABSTRACT

A retainer of a crossed roller bearing has a retainer body plate of rectangular profile corresponding to a rectangular cross-section of a race. Rectangular side surfaces on either side of the retainer body plate are inclined planes that slant in a direction of approaching one another from one corner to another corner along a diagonal line of the surfaces, and extend towards a bearing center in a state of having been installed in the race. Recesses for accumulating grease are formed in center portions of the rectangular side surfaces, the recesses communicating via a through-hole. The rectangular side surfaces are in linear contact with the circular external circumferential surfaces of adjacent rollers and hold the rollers at a fixed spacing. There is obtained a retainer for an uncomplicatedly configured crossed roller bearing that allows adjacent rollers to be held at a fixed spacing and is provided with a grease accumulator.

3 Claims, 2 Drawing Sheets

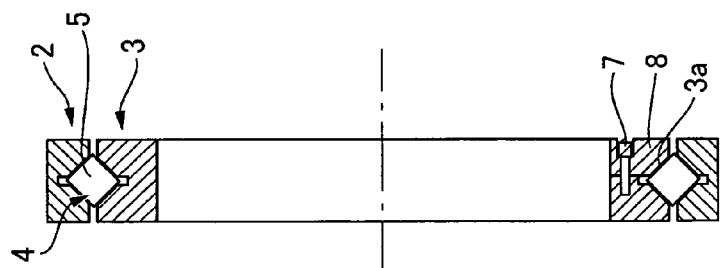
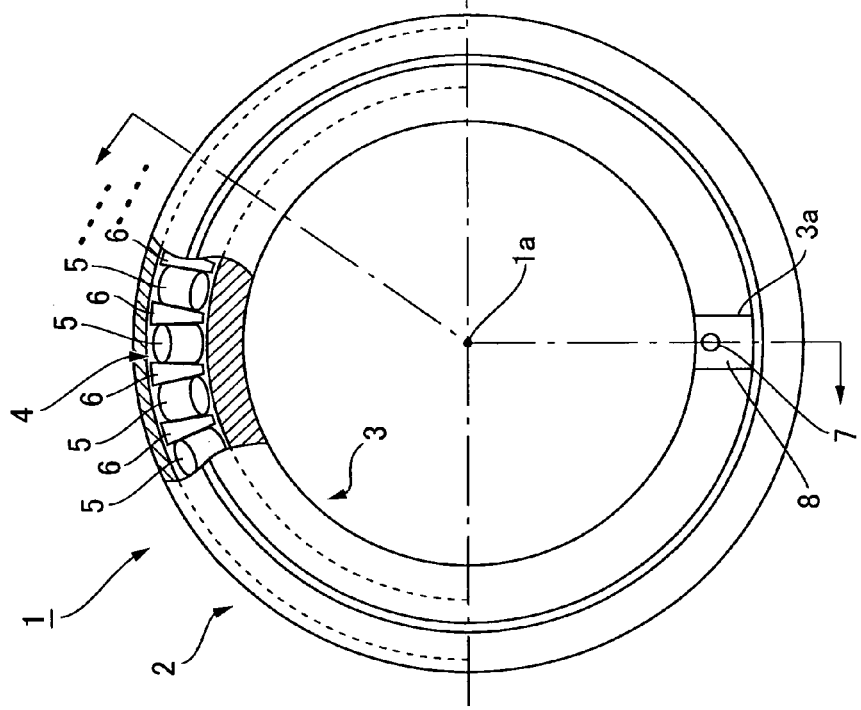

CROSSED ROLLER BEARING RETAINER AND CROSSED ROLLER BEARING

BACKGROUND OF THE INVENTION

1. Field of the Invention

The present invention relates to a crossed roller bearing in which cylindrical rollers are inserted into an annular race of rectangular cross-section so as to be in an alternatingly crossed state. More specifically, the present invention relates to an improvement to a crossed roller bearing retainer in which the rollers are held at a fixed spacing so that adjacent rollers are not in contact.

2. Description of the Related Art

With crossed roller bearings, a spacer retainer is disposed between rollers that are inserted into a race having a rectangular cross-section, thereby holding the rollers at a fixed spacing so that they do not touch. The spacer retainer is provided with a concave surface that is in surface contact with the circular outer circumferential surfaces of the adjacent rollers as disclosed in FIGS. 2 and 5 of Patent Document 1, in FIG. 4 of Patent Document 2, and in Patent Document 3 below.

[Patent Document 1] JP-A 10-141363
[Patent Document 2] JP-A 05-276768
[Patent Document 3] JP-B 3424875

The spacer retainers proposed in the Patent Documents above have complex shapes with surfaces that follow a concave surface, allowing surface contact with the circular external circumferential surfaces of the rollers. There are thus problems with non-trivial production as well as comparatively high production costs that remain to be resolved. Moreover, as disclosed in Patent Document 3, skill is required in designing the shape so that grease is adequately supplied to each section of the race.

SUMMARY OF THE INVENTION

With the foregoing aspects of the prior art in view, it is an object of the present invention to provide a crossed roller bearing retainer that has a simple shape and also maintains a fixed spacing between adjacent rollers.

Another object of the present invention is to provide a crossed roller bearing retainer having a simple shape that provides grease accumulation.

Another object of the present invention is to provide a crossed roller bearing that has this type of novel crossed roller bearing retainer.

In order to attain the objects described above, according to the present invention, there is provided a crossed roller bearing retainer for holding adjacent cylindrical rollers at a fixed spacing in an annular race of rectangular cross-section in a crossed roller bearing; the crossed roller bearing retainer comprising a retainer body plate having a rectangular profile that corresponds to the rectangular cross-section of the race, wherein rectangular side surfaces on either side of the retainer body plate and in contact with the rollers are inclined planes that slant in a direction of approaching each other along a direction of a diagonal line on the surfaces, from one corner to another corner, and that are oriented toward a bearing center in a state of being installed in the race.

In another aspect of the crossed roller bearing retainer according to the present invention, a recess part of a prescribed depth for grease to accumulate is formed in a center portion of each of the rectangular side surfaces; and portions of a bottom surface of the recess part formed in each of the rectangular side surfaces communicate with each other via the retainer body plate.

With the crossed roller bearing according to the present invention, on the other hand, adjacent cylindrical rollers are held in the race at a fixed spacing by the crossed roller bearing retainer having the configuration described above.

According to the crossed roller bearing retainer of the present invention, the side surfaces on both sides of the rectangular-profile retainer body plate form slanted flat surfaces, and these slanted flat surfaces extend in the direction of the bearing center. Consequently, the circular external circumferential surfaces of adjacent rollers are in linear contact with each other, and the spacing between them is held constant. In other words, adjacently-disposed rollers can be held at a fixed spacing utilizing a retainer having a simple shape in which the thickness of the rectangular-contoured plate gradually decreases from one corner to the other corner on one of the diagonal lines thereof.

In addition, as a grease accumulation, recess parts are formed on the slanted flat surfaces on both sides of the rectangular-profile retainer body plate, and these parts are communicated to each other, thereby allowing smooth supply of grease to the rollers in a state of linear contact via the grease accumulation.

BRIEF DESCRIPTION OF THE DRAWINGS

FIG. 1A is a partial cut-away side view showing a crossed roller bearing according to the present invention.

FIG. 1B is a sectional view of the crossed roller bearing of FIG. 1A.

DESCRIPTION OF THE PREFERRED EMBODIMENTS

Figure 2C:
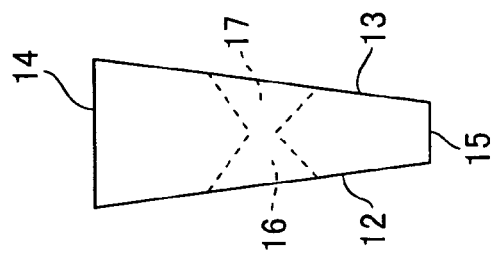
FIG. 2C is a side view of the crossed roller bearing of FIG. 2A.

A crossed roller bearing of an embodiment of the present invention is described below with reference to the drawings.

As shown in FIGS. 1A and 1B, the crossed roller bearing 1 has an integrally-formed outer ring 2, an integrally-formed inner ring 3, a plurality of cylindrical rollers 5 inserted into a ring-shaped race 4 with a rectangular cross-section formed between the rings 2, 3, and a plurality of retainers 6, each maintaining a fixed spacing between adjacent rollers 5. In this embodiment, the inner ring 3 is formed with a roller insertion groove 3a that extends from one of the ring-shaped side surfaces of the inner ring 3 to the race 4, and the roller 5 and retainer 6 are inserted into the race 4 from the roller insertion groove 3a. A plug 8 is inserted into the roller insertion grove 3a and fixedly connected to the inner ring 3 by a fastening bolt 7, so that the roller insertion groove 3a is sealed. Alternatively, the outer ring 2 or the inner ring 3 can be formed as a pair of divided rings that can be divided left and right, whereby the roller 5 and retainer 6 can be inserted into the race 4 formed between the divided rings.

Figure 2B:
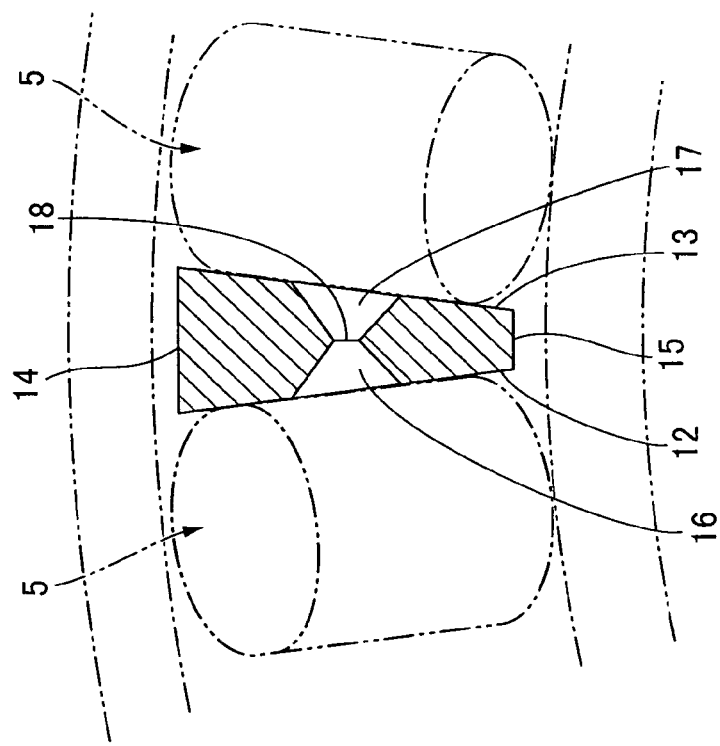
FIG. 2B is a sectional view of the of the crossed roller bearing retainer of FIG. 2A.
Figure 2A:
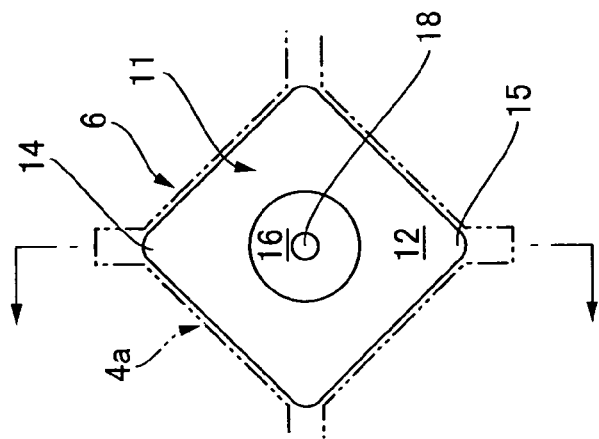
FIG. 2A is a plan view of the crossed roller bearing retainer of FIG. 1.

The retainer 6 that is interposed between adjacent rollers 5 is described below with reference to FIGS. 2A, 2B, and 2C. The retainer 6 has a retainer body plate 11 formed from plastic material, metal material, sintered material or the like. The retainer body plate 11 is a plate with a rectangular profile corresponding to the rectangular sectional shape 4a of the race 4 as indicated by the phantom lines in FIG. 2A.

The rectangular side surfaces 12 and 13 on both sides in the retainer body plate 11 that are in contact with the roller 5 are slanted flat surfaces that follow the direction of a diagonal line thereof, inclined at the same angle in the approaching direction to each other from one corner 14 to the other corner 15 on the diagonal line. Specifically, in the condition of being mounted on the race 4, the corner 14 is positioned towards the outer ring, the corner 15 is positioned towards the inner ring, and the rectangular side surfaces 12 and 13 on both sides are inclined flat surfaces that are oriented towards the bearing center 1a (refer to FIG. 1A). Consequently, the circumferential outer peripheral surfaces of the rollers 5 that are disposed on both sides of the retainer 6 inside the race 4 are in linear contact with the rectangular side surfaces 12 and 13, as shown in FIG. 2B.

Next, recess parts 16 and 17 for providing a grease reservoir or grease accumulator of a prescribed depth are formed in a symmetrical state in the middle portions of the rectangular side surfaces 12, 13. The recess parts 16 and 17 in this example have inverted cone-shaped internal circumferential surfaces, where the bottoms thereof are communicated with each other by a through-hole 18 passing through the retainer body plate 11.

In this manner, the retainer 6 in this example has rectangular side surfaces 12 and 13 on the left and right that form inclined flat surfaces that are in agreement with the left and right roller positions mounted in the race 4. Consequently, linear contact occurs with respect to the left and right rollers 5, and a fixed spacing can be maintained between them. In addition, because the circular outer circumferential surfaces of the rollers 5 are in linear contact with the left and right roller-shaped side surfaces 12 and 13, grease supply to adjacent rollers 5 occurs smoothly from the recess parts 16 and 17 for grease reservoir formed in the rectangular side surfaces 12 and 13. In addition, because the recess parts 16 and 17 are communicated with each other, grease can be supplied to each portion via the retainer 6 in the race 4.

What is claimed is:

1. A crossed roller bearing retainer for holding adjacent cylindrical rollers at a fixed spacing in an annular race of rectangular cross-section in a crossed roller bearing, comprising:
    a retainer body plate having a rectangular profile that corresponds to the rectangular cross-section of the race,
    the retainer body plate having rectangular side surfaces on either side thereof that are in contact with the adjacent rollers, and
    the rectangular side surfaces being inclined planes that slant in a direction of approaching each other along a direction of one of diagonal lines on the surfaces thereof, from one corner to another corner, and that are oriented toward a bearing center 1a in a state of being installed in the race.

2. The crossed roller bearing retainer according to claim 1, wherein
    each of the rectangular side surfaces and is formed in a center portion thereof with a recess part of a prescribed depth for grease to accumulate, and
    the recess parts are communicated with each other at their bottom surfaces via the retainer body plate.

3. A crossed roller bearing comprising:
    outer and inner rings forming an annular race therebetween,
    a plurality of cylindrical rollers inserted into the race, and
    a plurality of crossed roller bearing retainers inserted into the race for holding the adjacent cylindrical rollers in the race at a fixed spacing, wherein
    each of the crossed roller bearing retainers is one according to claim 1.

* * * * *